(12) United States Patent
Liu et al.

(10) Patent No.: US 9,930,494 B2
(45) Date of Patent: Mar. 27, 2018

(54) LEVERAGING LOCATION DATA FROM MOBILE DEVICES FOR USER CLASSIFICATION

(71) Applicant: Cisco Technology, Inc., San Jose, CA (US)

(72) Inventors: Hao Liu, Shanghai (CN); David Tang, Shanghai (CN); Zhitao Shen, Shanghai (CN); Hua Zhang, Shanghai (CN); Vikram Kumaran, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 14/881,538

(22) Filed: Oct. 13, 2015

(65) Prior Publication Data

US 2017/0105099 A1 Apr. 13, 2017

(51) Int. Cl.
*H04W 24/00* (2009.01)
*H04W 4/04* (2009.01)
*H04L 29/08* (2006.01)

(52) U.S. Cl.
CPC ............ *H04W 4/04* (2013.01); *H04L 67/22* (2013.01)

(58) Field of Classification Search
CPC ............................ H04W 4/04; H04L 67/22
USPC .............................. 455/456.1–456.6; 370/338
See application file for complete search history.

(56) References Cited

U.S. PATENT DOCUMENTS

| | | | |
|---|---|---|---|
| 7,042,391 B2 | 5/2006 | Meunier et al. | |
| 7,054,627 B1 | 5/2006 | Hillman | |
| 7,957,565 B1 | 6/2011 | Sharma et al. | |
| 8,208,943 B2 | 6/2012 | Petersen et al. | |
| 8,694,443 B2 | 4/2014 | Bobbitt et al. | |
| 2002/0062251 A1* | 5/2002 | Anandan ............. | G06Q 30/02 705/14.64 |
| 2011/0022443 A1 | 1/2011 | Partridge et al. | |

(Continued)

OTHER PUBLICATIONS

Liu et al., "Mining Checkins from Location-sharing Services for Client-independent IP Geolocation", INFOCOM, 2014 Proceedings IEEE, Apr. 27, 2014-May 2, 2014, 9 pages.

(Continued)

*Primary Examiner* — Marcos Batista
(74) *Attorney, Agent, or Firm* — Edell, Shapiro & Finnan, LLC

(57) ABSTRACT

Location data is obtained from signals transmitted by a first plurality of mobile wireless devices in a wireless network, wherein the first plurality of mobile wireless devices are moving within a predefined space, and wherein the location data comprises a plurality of location data time points, each location data time point including a timestamp, a unique mobile wireless device identifier, and location information indicating where in the predefined space an associated mobile wireless device is located. For each mobile wireless device, location data time points are aggregated to generate a set of aggregated location data for each mobile wireless device, and the set of aggregated location data is analyzed to determine characteristics corresponding to time-dependent behavior and location-specific behavior of the corresponding mobile wireless device. A user of each corresponding mobile wireless device is classified into a category of a plurality of categories based on the determined characteristics.

20 Claims, 11 Drawing Sheets

(56) References Cited

U.S. PATENT DOCUMENTS

2015/0018020 A1* 1/2015 Elovici ............... H04W 4/028
455/457
2015/0120712 A1 4/2015 Yi et al.
2015/0127728 A1* 5/2015 Marti .................. H04L 51/32
709/204

OTHER PUBLICATIONS

Becker et al., "Human Mobility Characterization from Cellular Netowrk Data", Communications of the ACM, Jan. 2013, vol. 56, No. 1, 9 pages.
Noulas et al., "A Tale of Many Cities: Universal Patterns in Human Urban Mobility", www.plosone.org, May 2012, vol. 7, Issue 5, 10 pages.
Jung et al., "Gravity model in the Korean highway", Center for Polymer Studies and Department of Physics, Boston University, Feb. 21, 2013, 13 pages.
Krings et al., "Urban Gravity: a Model for Intercity Telecommunication Flows", Jun. 15, 2009, 8 pages.
Song et al., "Modeling the scaling properties of human mobility", Article, Nature Physics 6, Sep. 12, 2010, 15 pages.
Kang et al., "Exploring Human Movements in Singapore: A Comparative Analysis Based on Mobile Phone and Taxicab Usages", UrbComp '13, Aug. 11-14, 2013, 8 pages.
Dr. James Little, et al., "A Technical Review of Cisco's Wi-Fi-Based Location Analytics", White Paper, Jul. 2013, 9 pages.
Galati, et al., "Opportunistic Forwarding Throughout Customers or Sellers in Shopping Mall Environments", 978-1-4673-4404-3, IEEE, 2012 IFIP Wireless Days, Nov. 21-23, 2012, 3 pages.
Lee et al., "Trajectory Clustering: A Partition-and-Group Framework", SIGMOD '07, Jun. 11-14, 2007, Beijing, China, 12 pages.
Li et al., "Traffic Density-Based Discovery of Hot Routes in Road Networks," Advances in Spatial and Temporal Databases, vol. 4605 of the series Lecture Notes in Computer Science, 2007, pp. 441-459, 19 pages.

* cited by examiner

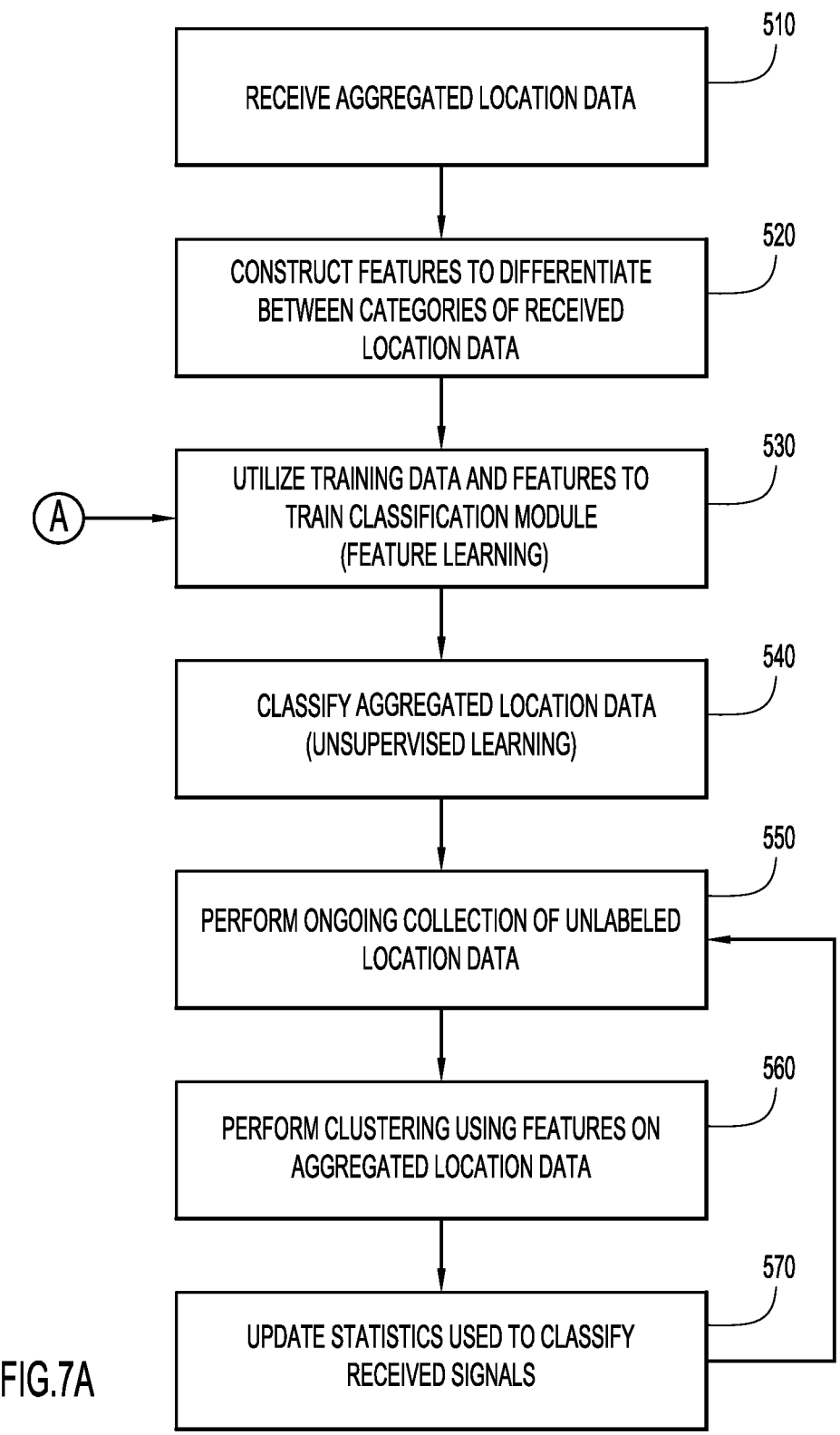

… (US 9,930,494 B2)

LEVERAGING LOCATION DATA FROM MOBILE DEVICES FOR USER CLASSIFICATION

TECHNICAL FIELD

The present disclosure relates to utilizing location data from a mobile device, and in particular, to utilizing location data to classify a user associated with the mobile device based on the movement patterns of the mobile device.

BACKGROUND

Classification of a person, e.g., whether a person is an employee, a visitor, an authorized person, an unauthorized person, etc., may be important for a number of applications, including advertising, security, etc. With regard to a professional office building, government office, etc., it may be desirable to distinguish a visitor from an employee to improve security. In this case, both types of users may be present in the same general area, at a same or overlapping time.

BRIEF DESCRIPTION OF THE DRAWINGS

FIG. 7A is a flow chart generally depicting the operations of obtaining and classifying location data information, according to an example embodiment.

DESCRIPTION OF EXAMPLE EMBODIMENTS

Overview

Figure 1:
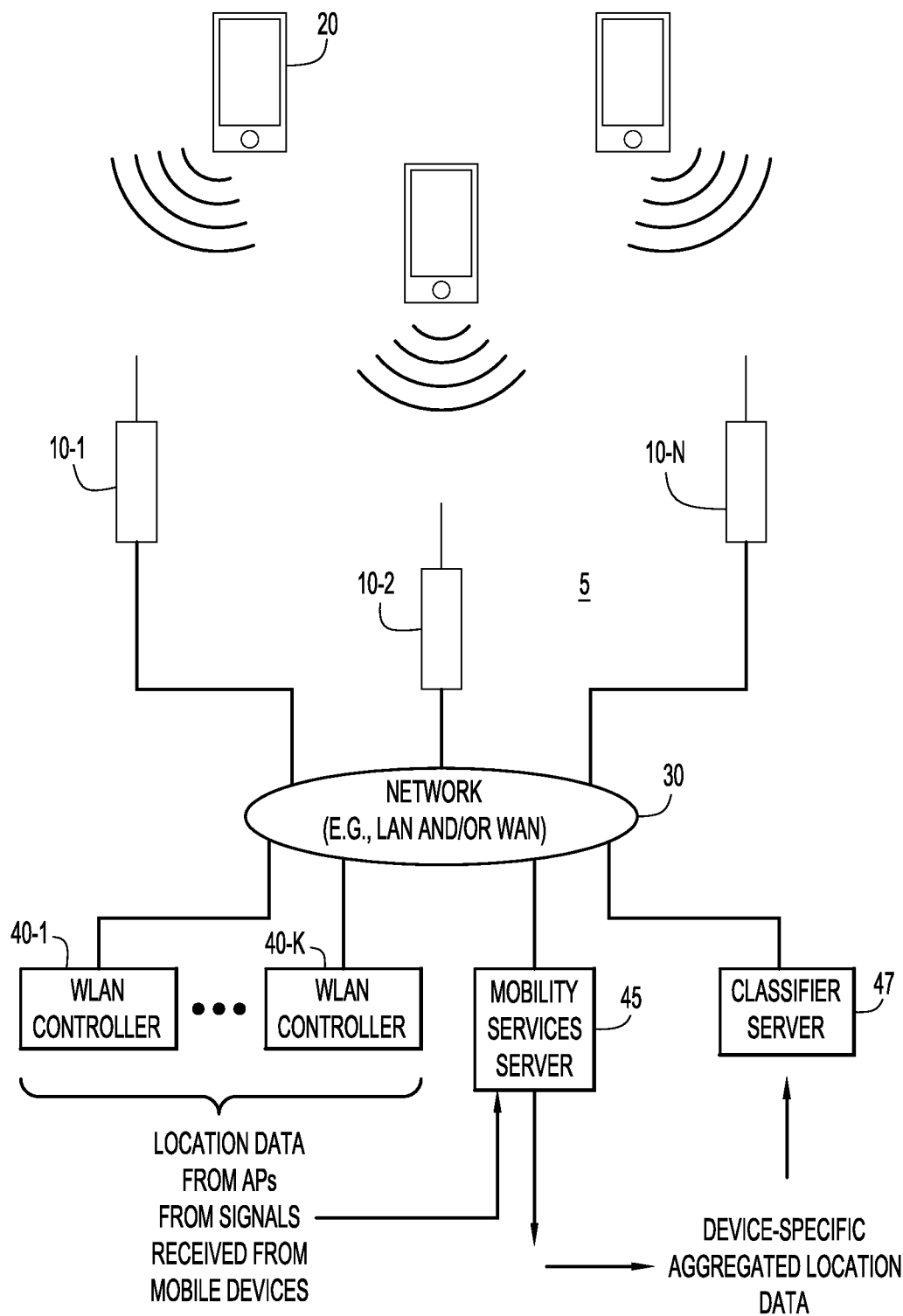
FIG. 1 is a system diagram showing wireless network infrastructure equipment configured to collect location data from mobile wireless devices, aggregate the location data for each mobile device, and classify the mobile device user, according to an example embodiment.

In one embodiment, techniques are provided for utilizing location data to classify a mobile device user. Location data is generated from signals transmitted by a first plurality of mobile wireless devices in a wireless network, wherein the first plurality of mobile wireless devices are moving within a predefined space. The location data comprises a plurality of location data time points, each location data time point including a timestamp, a unique mobile wireless device identifier, and location information indicating where in the predefined space an associated mobile wireless device is located. For each mobile wireless device, location data time points are aggregated to generate a set of aggregated location data for each mobile wireless device, and the set of aggregated location data is analyzed to determine characteristics corresponding to time-dependent behavior and location-specific behavior of the corresponding mobile wireless device. A user of each corresponding mobile wireless device is classified into a category of a plurality of categories based on the determined characteristics.

Example Embodiments

With the popularity of Wi-Fi® based analytics solutions, platforms have been developed to interface with mobile devices. Such platforms provide the ability to interact with mobile devices to collect and analyze data. For example, in some approaches, data associated with social networks or Call Detail Records (CDR) may be analyzed to determine a user's home location and work location, e.g., by assuming that a user is typically at home at night and at work during the day. Other approaches include determining a likelihood of a mobile device user moving from one location to another location, e.g., based on location data from social media, transportation data, or CDR data. These approaches typically evaluate historical patterns of movement between multiple distinct locations, which may not always be available, especially if a user is visiting a new place. Additionally, current techniques are not able to distinguish between multiple categories of users in a same or overlapping physical location. Still other approaches utilize aggregated statistics of a population of mobile device users, however, such aggregated statistics cannot be leveraged to differentiate between individual mobile device users.

While Media Access Control (MAC) addresses may be used to categorize a mobile user, manual collection and entry of the corresponding MAC addresses for the mobile users have a number of drawbacks. For example, this approach does not readily scale to large numbers of mobile device users due to: (1) costly and inefficient process to manually track mobile device users; (2) privacy or other related issues associated with obtaining mobile device user information from employers or other entities; and (3) high cost of system maintenance to keep the data up-to-date on a daily basis.

Presented herein are techniques for utilizing mobile device location data to classify mobile device users within a predefined physical space, e.g., to determine whether the mobile device user is an employee or a visitor. A platform/dashboard may be utilized to receive mobile device location information, and display corresponding movement patterns for a plurality of mobile device users. In some aspects, platforms/dashboards may be configured to show a subset (or even a single) category of classified users, e.g., by filtering out employees to display visitors and unknown personnel.

A movement pattern of a mobile device in a public or private setting, e.g., a mall, office, or other venue, may be analyzed to classify the corresponding mobile device user into a category, e.g., a permanent category (e.g., an employee or other authorized personnel), or a temporary category (e.g., a visitor or other unauthorized personnel). Typically, the movement pattern of the mobile device is collected utilizing existing wireless local area network (e.g., Wi-Fi) infrastructure.

Public venues, such as shopping malls, concert arenas, businesses, etc., can accommodate large groups of people. Although security personnel are frequently on-site, monitoring large numbers of people for prolonged periods of time becomes impractical, inefficient and error-prone. Accordingly, present herein are techniques directed towards distinguishing between different types of personnel, e.g., permanent personnel from temporary personnel in an automated manner, based upon signals from wireless devices. Businesses may wish to distinguish between permanent and temporary personnel for improving security.

Referring to FIG. 1, a wireless communication network is shown generally at reference numeral 5 comprising a plurality of wireless access points (APs) 10-1, 10-2, . . . , 10-N, that are configured to wirelessly communicate with one or more client devices (also referred to herein as mobile wireless devices), one of which is shown at reference numeral 20. An individual mobile wireless device 20 is shown in FIG. 1 as an example and it is to be understood that the APs 10-1 through 10-N are capable of communicating with multiple mobile wireless devices. The mobile wireless device 20 may be a smart phone device or any other mobile device with WLAN connectivity.

In one example, the APs 10-1 through 10-N and the mobile wireless device 20 operate in accordance with one of the IEEE 802.11 wireless local area network (WLAN) family of wireless communication protocols, known commercially as Wi-Fi®. However, the techniques described herein are not limited to any particular wireless communication protocol and may be employed in WLANs as well as wireless wide area networks.

It is common in certain WLAN deployments, for users of mobile wireless devices to roam around a large physical location, e.g., a building, an office, a campus, etc., and in so doing, different APs may be needed to maintain connectivity of the mobile wireless device to the WLAN. Systems and methods for providing roaming support of mobile wireless devices are considered to be well-known and are not covered in detail herein.

Each of the APs 10-1 through 10-N are connected to a network (wired or wireless) 30, which typically includes local area network and wide area network connectivity. A plurality of WLAN controllers 40-1 to 40-K are also connected to the network 30. The WLAN controllers 40-1 to 40-K are used to control the various operating parameters of the APs (such as channel assignment, load, etc.). A group of APs may be assigned to a particular one of the WLAN controllers 40-1 to 40-K. The APs 10-1 to 10-N send received mobility location information obtained from the mobile wireless devices as the users of the mobile wireless devices move about a physical area. Mobile device users in each respective category, e.g., temporary or permanent, may move about the same or overlapping physical area.

A mobility services server 45 is provided to collect location data (from the WLAN controllers 40-1 to 40-K) obtained by the APs 10-1 to 10-N for individual mobile wireless devices. As explained herein, the mobility services server 45 aggregates the location data from multiple APs for each mobile wireless device and generates aggregated location data for each mobile wireless device in the network, with the aggregated location data including location data points obtained from the movement of the corresponding mobile device user as a function of time. The mobility services server 45 forwards the aggregated data (including timestamp information, device identification, and location information) to the classification server 47, and the classification server 47 classifies the user of the mobile device into a category based on the aggregated data.

While FIG. 1 shows that the mobility services server 45 and classification server 47 are separate stand-alone servers, this is not meant to be limiting. For example, the functions of the classification server 47 may be implemented as an application/process running on the mobility services server 45, or as an application on any application server. Thus, the functions of mobility services server 45 and classification server 47 may be integrated on the same server. In addition, while the location data is shown as being aggregated by the mobility services server 45, in other embodiments, the location data may be provided to the classification server 47 for aggregation and subsequent classification. Moreover, the functions of the mobility services server 45 and the classification server 47 may be implemented by one or more applications running in a cloud/data center environment.

Figure 2:
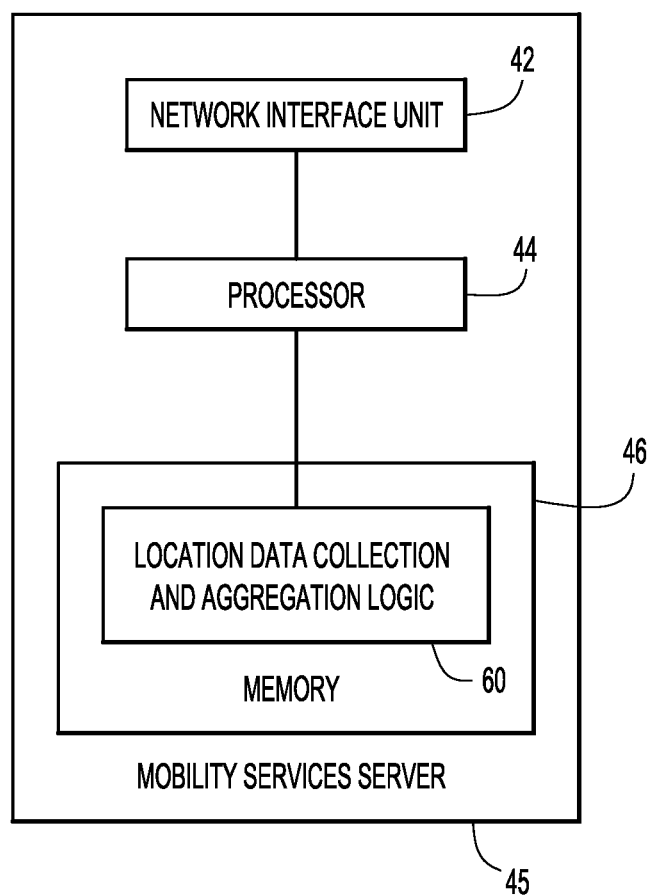
FIG. 2 is an example block diagram of a server configured to collect and aggregate location data from mobile wireless devices using wireless access points, according to an example embodiment.

Turning to FIG. 2, a block diagram showing an example of the components of the mobility services server 45 is now described. The mobility services server 45 includes a network interface unit 42, a processor 44 and a memory 46. The network interface unit 42 is, for example, an Ethernet card (or multiple instances of such devices), and enables network connectivity to communicate over network 30 with the APs 10-1 to 10-N. The processor 44 is one or more microprocessors or microcontrollers. The memory 46 may be in the form of read only memory (ROM), random access memory (RAM), magnetic disk storage media devices, optical storage media devices, flash memory devices, electrical, optical, or other physical/tangible memory storage devices. The memory 46 stores instructions for location data collection and aggregation logic 60. Location data collection and aggregation logic 60 receives information associated with the movements of mobile wireless devices as a function of time, and in some aspects, from multiple APs for an individual mobile wireless device. Data for each mobile wireless device may be aggregated based upon a unique identifier for each mobile wireless device and subsequently analyzed by the classifier server 47 as described herein. Thus, in general, the memory 46 may comprise one or more tangible computer readable storage media (e.g., a memory device) encoded with software comprising computer executable instructions and when the software is executed (by the processor 44), it is operable to perform the operations described herein in connection with location data collection and aggregation logic 60.

Figure 3:
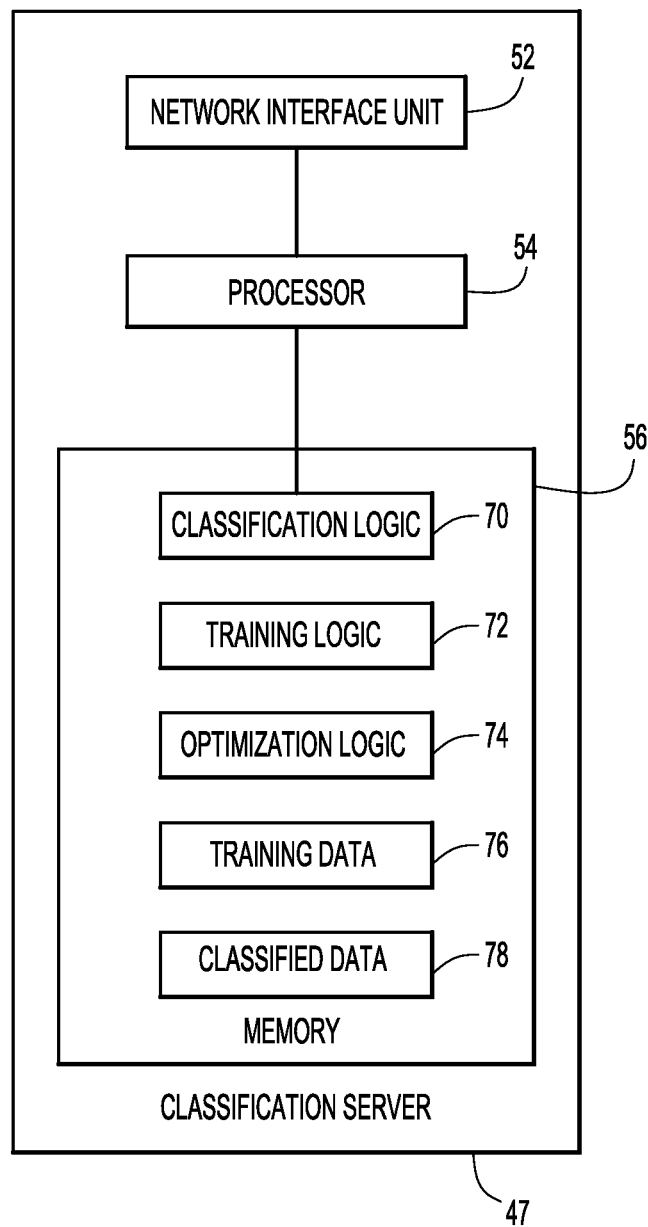
FIG. 3 is an example block diagram of a server configured to perform classification for each mobile wireless device user, according to an example embodiment.

A block diagram showing an example of the components of the classification server 47 is now described with reference to FIG. 3. The classification server 47 includes a network interface unit 52, a processor 54 and a memory 56. The network interface unit 52 is, for example, an Ethernet card, and enables network connectivity over network 30 to communicate with the WLAN controllers 40-1 to 40-K. The processor 54 is one or more microprocessors or microcontrollers. The memory 56 may be in the form of ROM, RAM, magnetic disk storage media devices, optical storage media devices, flash memory devices, electrical, optical, or other physical/tangible memory storage devices. The memory 56 stores instructions for classification logic 70, training logic 72, and optimization logic 74, whose operations are described further hereinafter. The memory also stores training data 76, which is used to generate input data for classification logic 70, as well as classified data 78. Thus, in general, the memory 56 may comprise one or more tangible computer readable storage media (e.g., a memory device) encoded with software comprising computer executable instructions and when the software is executed (by the processor 54) it is operable to perform the operations described herein in connection with classification logic 70, training logic 72, and optimization logic 74.

Figure 4:
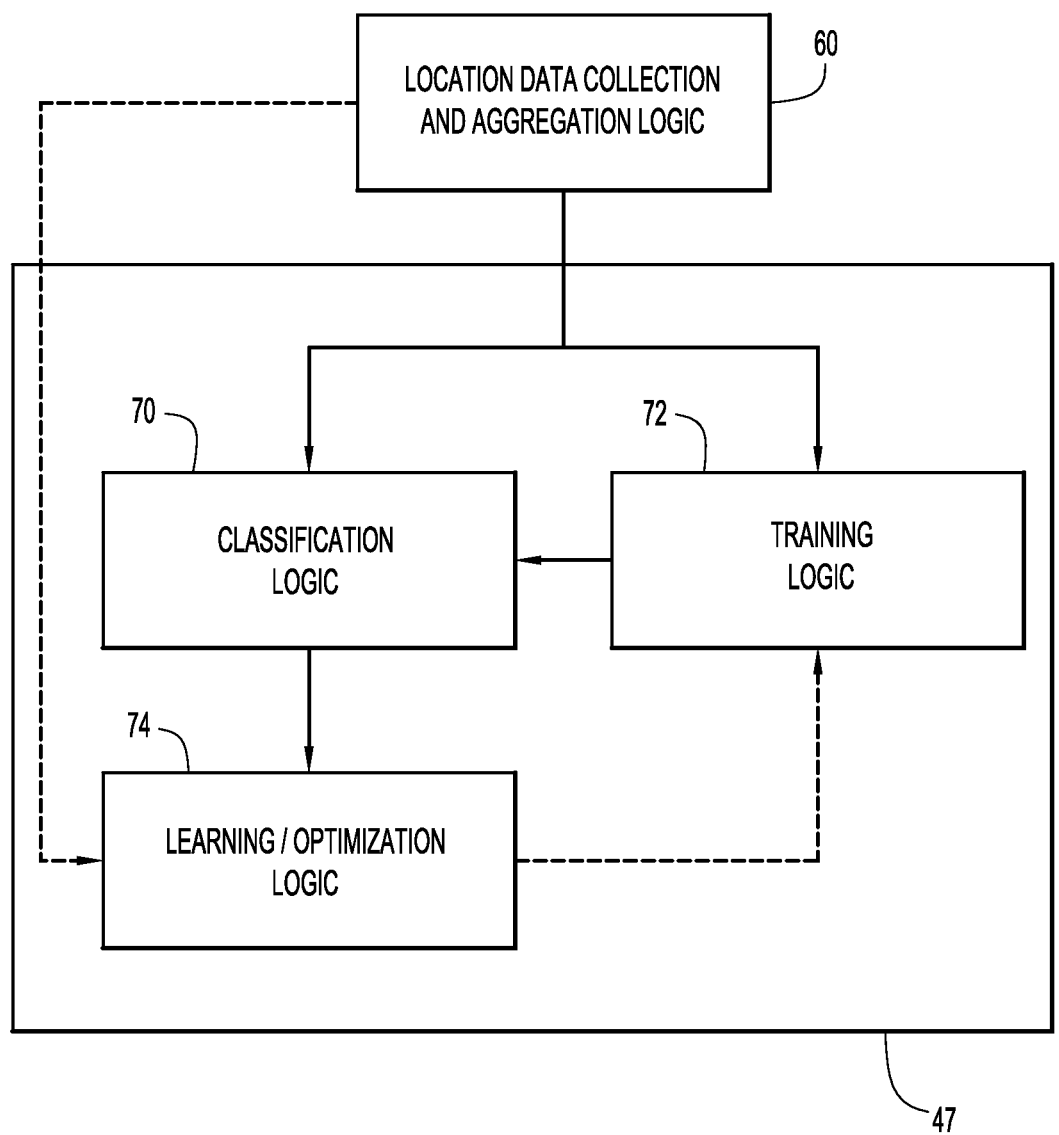
FIG. 4 is a diagram depicting functional relationships of the operations for collecting location data, training a classifier, classifying users of mobile devices, and optimizing classification, according to an example embodiment.

FIG. 4 generally pictorially depicts the operations of the techniques described herein in utilizing location data of mobile wireless devices to classify a mobile device user. The location data collection and aggregation logic 60 obtains location data from each mobile wireless device, the data comprising location readings from APs for each mobile wireless device. The mobility services server 45 aggregates received location data for each mobile device (e.g., based on an identifier, such as a MAC address) from a collection of APs, and provides this information to training logic 72 and classification logic 70.

The function of the classification server 47 is now generally described with respect to operations of training logic 72, classification logic 70 and model optimization logic 74. Classification server 47 may be a standalone server, or may be integrated with the mobility services server 45. The classification server 47 receives the aggregated location data for each mobile device generated by location data collection and aggregation logic 60.

A subset of aggregated location data is provided to training logic 72 for manual or automatic classification, in order to create a set of training data. The training process is described in additional detail herein. The set of training data is provided to classification logic 70.

Classifier logic 70 utilizes the training data to analyze the remaining aggregated location data (that has not been classified as part of the training data) provided from the mobility services server, and categorizes corresponding mobile device users into a category of a plurality of categories. In some aspects, the entire aggregated location data may be re-analyzed on an ongoing basis, e.g., daily. As shown by the dashed line in FIG. 4, once the remaining aggregated location data has been classified, subsequently collected aggregated location data may be provided to optimization logic 74 as part of the learning/optimization process, and new unlabeled data may be selected for inclusion into the training data set. Logic modules 70-74 are described below in more detail with respect to FIGS. 6A-8.

Figure 5:
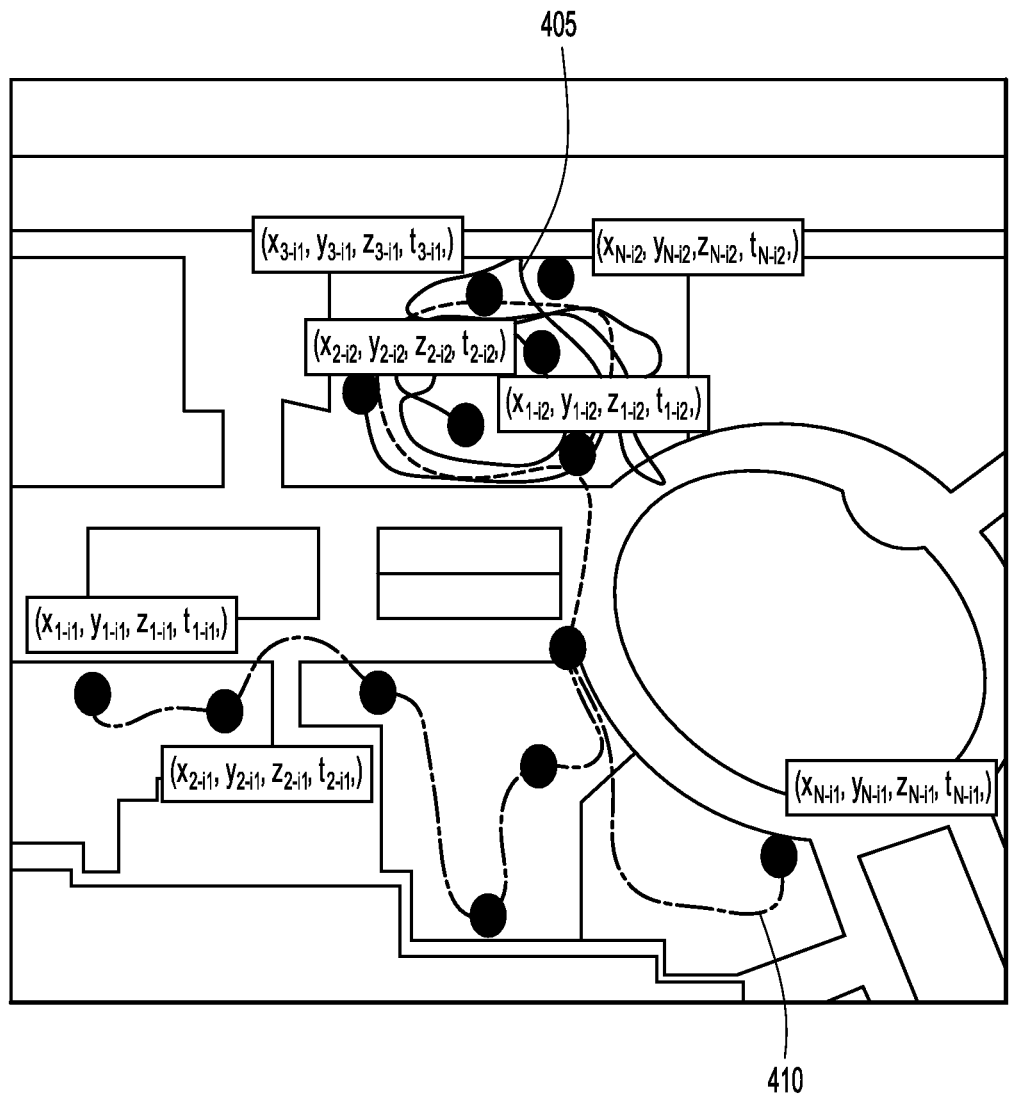
FIG. 5 is a graphical diagram showing examples of sampling mobile device signals within a same physical location, according to an example embodiment.

Referring to FIG. 5, a graphical representation is shown for displaying locations of mobile wireless devices as a function of time. The solid line shown at reference numeral 405 represents the trajectory of a temporary mobile device user as a function of time. The dashed line shown at reference numeral 410 represents the trajectory of a permanent mobile device user as a function of time. Circular dots represent a sampling of time points at which signals were received at an AP regarding the position of the mobile device. It is understood that location information is received at a much higher frequency (than as shown in this figure) and is sufficient to reconstruct the trajectory of the mobile device user.

In some aspects, location data may be collected according to a data schema that defines one or more of a timestamp t and location coordinates (x, y, z) for every $i^{th}$ mobile wireless device.

This approach may interface with platforms/dashboards showing a plurality of floors, and individual mobile devices on a particular floor. As Wi-Fi is widely deployed, location data may be collected by existing (indoor) Wi-Fi infrastructure, although other positioning techniques which provide timestamp and location coordinates may be used.

A plurality of location data time points may be collected for each mobile wireless device, where x, y, and z indicate a location and t indicates a time, for the $i^{th}$ mobile device. Accordingly, each location data time point may be represented in a form of $(x_{1-i1}, y_{1-i1}, z_{1-i1}, t_{1-i1})$. All location data time points for each $i^{th}$ mobile device may be grouped together, e.g., the set of $(x_{1-i1}, y_{1-i1}, z_{1-i1}, t_{1-i1})$, $(x_{2-i1}, y_{2-i1}, z_{2-i1}, t_{2-i1})$, ... $(x_{N-i1}, y_{N-i1}, z_{N-i1}, t_{N-i1})$, to form a set of aggregated location data. Multiple sets of aggregated location data are generally referred to as aggregated data. In this example, "i1" corresponds to a first mobile device, and "i2" corresponds to a second mobile device, as shown in FIG. 5.

Figure 6A:
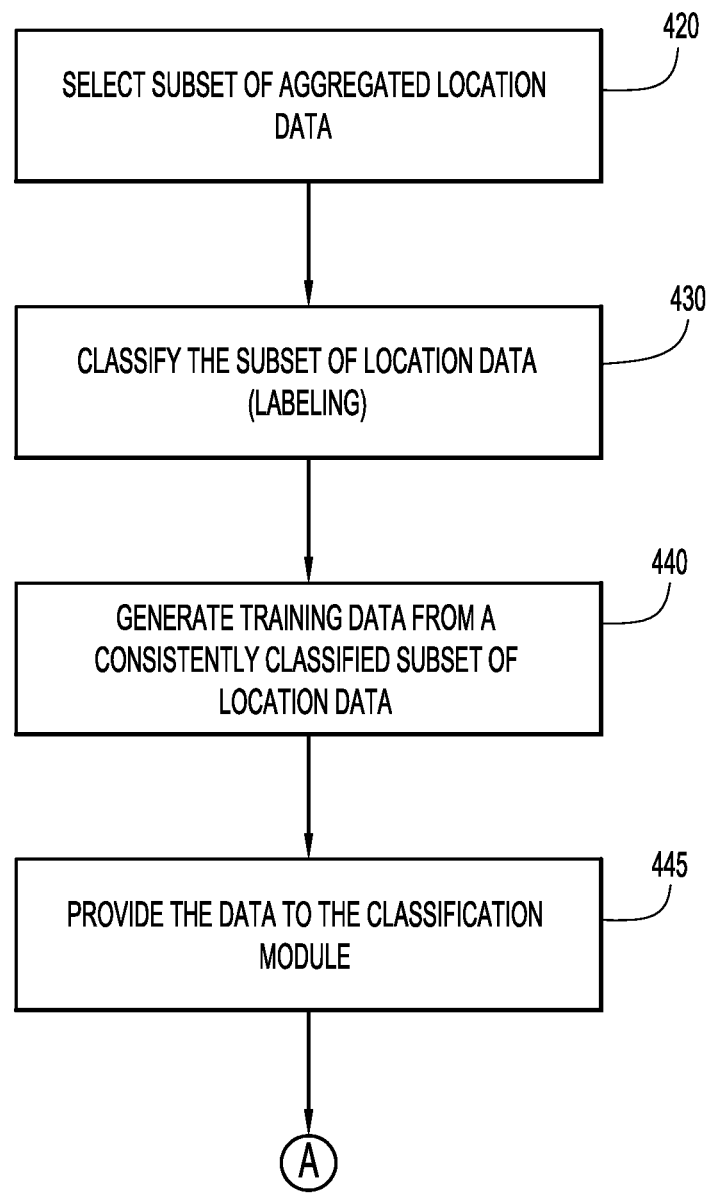
FIG. 6A is a flow chart generally depicting the operations of generating training data, according to an example embodiment.

FIG. 6A shows operations of training logic 72. At operation 420, a subset of aggregated location data received from the mobility services server is selected. This subset of aggregated location data comprises location data for particular mobile wireless devices that have been consolidated into a single record, table, list, etc., based on the mobile device identifier. For a plurality of mobile devices, each device has a corresponding unique signal identifier (e.g., such as a MAC address) that may be used to group location data.

A series of location data time points for a mobile device may be generated by mobility services server 45. Each location data time point may include: (1) a timestamp, (2) an identifier for the mobile device signal, such as a MAC address, and (3) a physical location comprising coordinates (x, y, z) to establish the location of the mobile device signal, e.g., the location of a mobile device signal on a particular floor may be established using x, y coordinates, and a z coordinate may be used to determine on which floor of a plurality of floors the mobile device is located.

Regarding the selected subset of aggregated location data (the training data), this data may comprise sets of aggregated data from a plurality of mobile devices, exhibiting movement patterns consistent with different categories of users, e.g., permanent and temporary mobile device users.

The subset of aggregated location data received from the mobility services server may be in a form of location coordinates as a function of time (e.g., a series of time points) for each mobile device i, and may be represented as: $(x_{1-i1}, y_{1-i1}, z_{1-i1}, t_{1-i1})$, $(x_{2-i1}, y_{2-i1}, z_{2-i1}, t_{2-i1})$ ... $(x_{N-i1}, y_{N-i1}, z_{N-i1}, t_{N-i1})$, wherein x and y represent a location with respect to a particular floor, z indicates the particular floor, and t represents a timestamp. Each device may have a corresponding unique identifier i, such as a MAC address.

At operation 430, the selected subset of aggregated location data is analyzed, and each mobile device user included in the selected subset is labeled by a classifier (e.g., by an administrator, an automated process, etc.), as permanent, temporary, or unknown. Each set of aggregated location data (wherein a set refers to all location data time points for a particular mobile device) may be analyzed. In some aspects, the classification process for the training data may be performed manually by different people, e.g., at least three times by three different people. In other aspects, the classification process may be performed automatically by a software process. In some aspects, each classifier may analyze each set of aggregated location data independently from the other classifiers.

Training data is selected from the labeled aggregated location data of operation 430. If a set of aggregated location data for a particular wireless device has been consistently classified by manual classifiers, e.g., consistently classified as belonging to the same category, or classified by a majority of classifiers as belonging to the same category, at operation 440, this set of labeled aggregation location data may be included in the training data. In the case of automated classification, if the set of aggregated location data has been classified as permanent or temporary (and not unknown), it may be included in the training data set. Otherwise, the set is omitted from the training data.

For example, manual or automated classification may be performed to determine that a set of aggregated location data corresponding to mobile device A is permanent. In some aspects of manual classification, a trajectory of the mobile device user as a function of time may be displayed as shown in FIG. 5, allowing the classifier to evaluate the set of aggregated data in a graphical format.

Figure 6B:
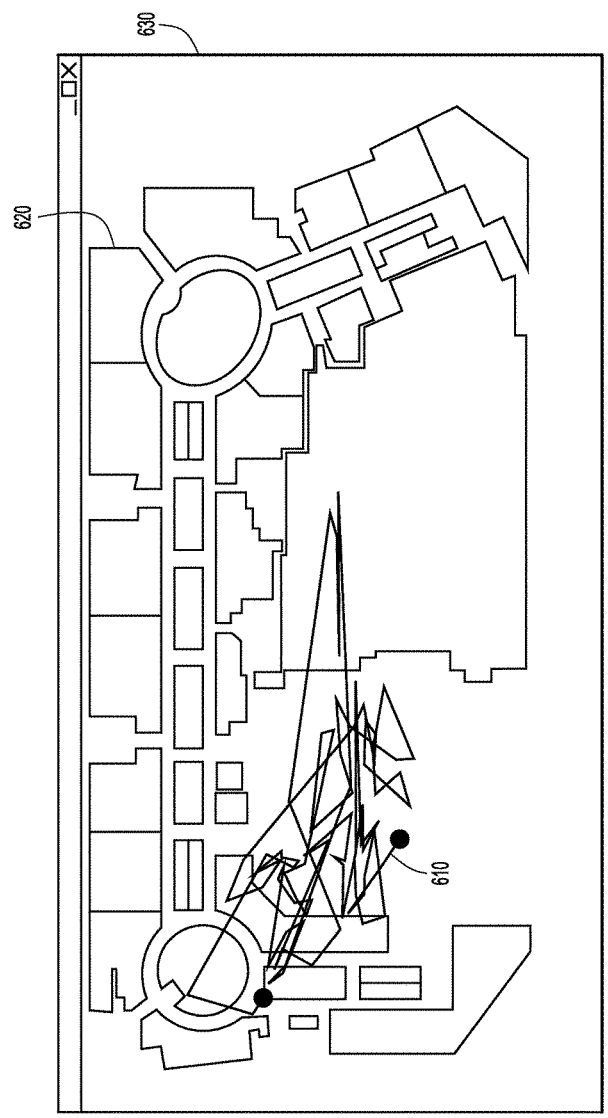
FIG. 6B is a graphical diagram showing, as part of the process of labeling training data, an example of visualizing aggregated location data for a mobile device user in order to classify the mobile device user, according to an example embodiment.

The trajectory may be overlaid onto a physical blueprint of a building, allowing the position of the mobile signal to be visualized with respect to particular floors, business locations, etc. FIG. 6B provides an example of overlaying a trajectory 610 onto a physical blueprint of a building 620.

Based on the characteristics of the trajectory, a classifier may label a set of aggregated location data as being associated with a particular one of a pluralities of categories, e.g., permanent, unknown, or temporary. For example, a set of aggregated location data remaining predominantly within a small area (e.g., a floor, a part of a building, etc.) may be determined to correspond to a permanent mobile device user, whereas a set of aggregated location data spread across a large area (e.g., on multiple floors, throughout multiple regions of a building, etc.) may be determined to correspond to a temporary mobile device user. Other criteria, such as a dwell time or an amount of time in a location, may be considered during the process of labeling as well. For example, with regard to FIG. 6B, an example is shown of a graphical interface or tool 630 that may be used to assist a classifier with labeling a mobile device user. In this example, the mobile device user associated with the green trajectory is labeled as permanent, as the corresponding trajectory largely resides with a single department store over a time span corresponding to a work day. A classifier may label the trajectory with criteria, which includes but is not limited to, a moving pattern and a dwell time. A classifier also may correlate location data over a longer duration of time (e.g., over several weeks) as part of the trajectory labeling process. In other aspects, a classifier may evaluate raw data without using a graphical tool, e.g., wireless mobile devices may be labeled directly without visualizing their corresponding trajectories. For example, if a user associated with a particular mobile wireless device is known to be an employee, and the mobile device identifier of the particular mobile wireless device is known or is provided to the classifier, the corresponding trajectory may be labeled as permanent.

Continuing with this example, and referring back to FIG. 6A, a manual or automated classifier may each determine that a set of aggregated location data corresponding to mobile device signal B corresponds to a temporary mobile device user. In addition, manual or automated classification may not reach a consistent determination about whether the set of aggregated location data corresponding to mobile device signal C corresponds to a temporary, permanent, or unknown user. In the case of manual classification, the first classifier may select a permanent category, the second classifier may select a temporary category, and the third classifier may select an unknown category for the mobile device user. An automated process may simply label the trajectory as unknown.

Once labeling is complete, sets of aggregated location data with consistent labeling (or within a specified confidence interval) are selected for inclusion within the training data at operation 440. Classification states that are not consistent (or fall outside a specified confidence interval) are not selected for the training data. Accordingly, in this example, data for mobile devices A and B are selected for inclusion within the training data set, while data for mobile device signal C is not.

At operation 445, the training data is provided to classification module 70, in order to train the classifier logic 70, as described now in connection with FIG. 7A.

FIG. 7A represents operations of classifier logic 70. A set of aggregated location data, for each mobile device signal, is provided to classifier logic 70 for analysis and classification. Training data, produced by training logic 72, is provided to classifier logic 70, in order to train the classifier regarding categorization of users of mobile devices.

At operation 510, aggregated location data is received from the mobility services server 45. At operation 520, features are constructed. The features represent various types of analysis that may be performed on aggregated data in order to determine characteristics of aggregated location data that may be used to differentiate between categories of corresponding mobile device users. For example, the features may include determination of a dwell time, a movement pattern, or movement dispersion, etc. One or more features may be utilized to classify a mobile device user into a respective category.

One feature is a dwell time, which is a length of time denoting how long a mobile device signal resides within a particular area. A longer dwell time is associated with a mobile device user having a permanent status (e.g., an employee), while a shorter dwell time is associated with a mobile device user having a temporary status. For example, with respect to a department store, trajectories of employees and visitors may overlap as both are moving within the same space, however, dwell times generally differ between these two populations of mobile device users. An employee of a department store may reside within a boundary of a store for an amount of time corresponding to a work shift of the employee, and may only be outside the boundary of the store during designated times within the work shift. In contrast, a visitor may visit the department store for a much smaller amount of time, e.g., an amount of time sufficient for making a purchase. Accordingly, this basic feature may be useful for distinguishing between categories of mobile device users.

Another feature is floor dispersion, which corresponds to a distribution of a duration of time that a mobile device user remains on one floor of a plurality of floors. For example, mobile devices users remaining on a single floor, e.g., a zone, a department, a room, etc., may be classified as having a permanent status, while mobile device users that roam multiple floors may be classified as having a temporary status. For example, at a shopping mall, a mobile device user having a permanent status would most likely remain on a particular floor, while a mobile device user having a temporary status would most likely roam across multiple floors.

Floor dispersion may be calculated according to: (sum $(n\_p/N-1/m)^2)/m$, where $n\_p$ denotes a number of location records on the $p^{th}$ floor, N denotes a total number of location records, and m denotes the total number of floors.

Still another feature is location dispersion, which denotes a measure of dispersion of location data time points for a mobile device user. Heuristically, a smaller dispersion means that the corresponding mobile device user has a higher probability of having a permanent status (e.g., an employee).

Location dispersion may be calculated based on: (sum(dist(loc_j, avgLoc)^2))/n, where avgLoc denotes the average location coordinates of all sampled locations, loc_j denotes the location coordinate of the $j^{th}$ location time point, dist denotes the distance between the average location and a respective individual location data time point, and n denotes the total number of location data time points. In some aspects, the location dispersion of an aggregated signal is calculated for each floor and the total location dispersion is determined to be the average location dispersion across all floors.

Any combination of features may be used to determine a categorization of an associated mobile device user. For example, in some instances, a dwell time may clearly distinguish between mobile device users having a temporary status from a permanent status. In other instances, a combination of dwell time and location dispersion may be needed to distinguish between the two categories. These examples are not intended to be limiting. Any number of features, which are essentially metrics for characterizing spatial and temporal characteristics of received mobile device location data, in any combination may be used to distinguish mobile device users with respect to any number of categories.

Once the features are constructed, at operation 530, the training data set and features may be used to train the classifier. For example, using the training data set, corresponding basic features for each set of aggregated location data may be determined (e.g., dwell times, location dispersion, and floor dispersion) and provided as input into the classifier with the corresponding labels (permanent or temporary) indicating the target output of classification. Once the classifier has been trained, the aggregated location data may be classified at operation 540.

A system based on this model may exhibit low precision as the aggregated data increases in size, due to ongoing receipt of unlabeled aggregated location data at operation 550. A small set of training data may not reflect changes in movement patterns with respect to time. For example, data may be collected pertaining to part-time employees working shorter shifts, employees working different shifts, and so forth. Accordingly, in order to achieve acceptable precision, new basic features and corresponding values may need to be integrated into the system.

In some aspects, and as shown at operation 560, new features may be derived based upon clustering, e.g., using k-means clustering to cluster the entire data set (all aggregated data, beginning with the earliest generated signal up through the latest generated signal). The value of k may be estimated by the number of possible groups of mobile device users with respect to a particular deployment. For example, at a shopping mall, k could be the number of floors or the number of departments. For each sampled mobile device signal, k binary features indicating whether the current mobile device signal belongs to each of the k clusters are integrated into the model.

In some aspects, a combination of features may be represented as vectors. An average value for a feature may be calculated, and corresponding distances between individual unlabeled data points (each data point corresponding to a mobile device user) and the average value for a feature of a category may be determined.

Figure 7B:
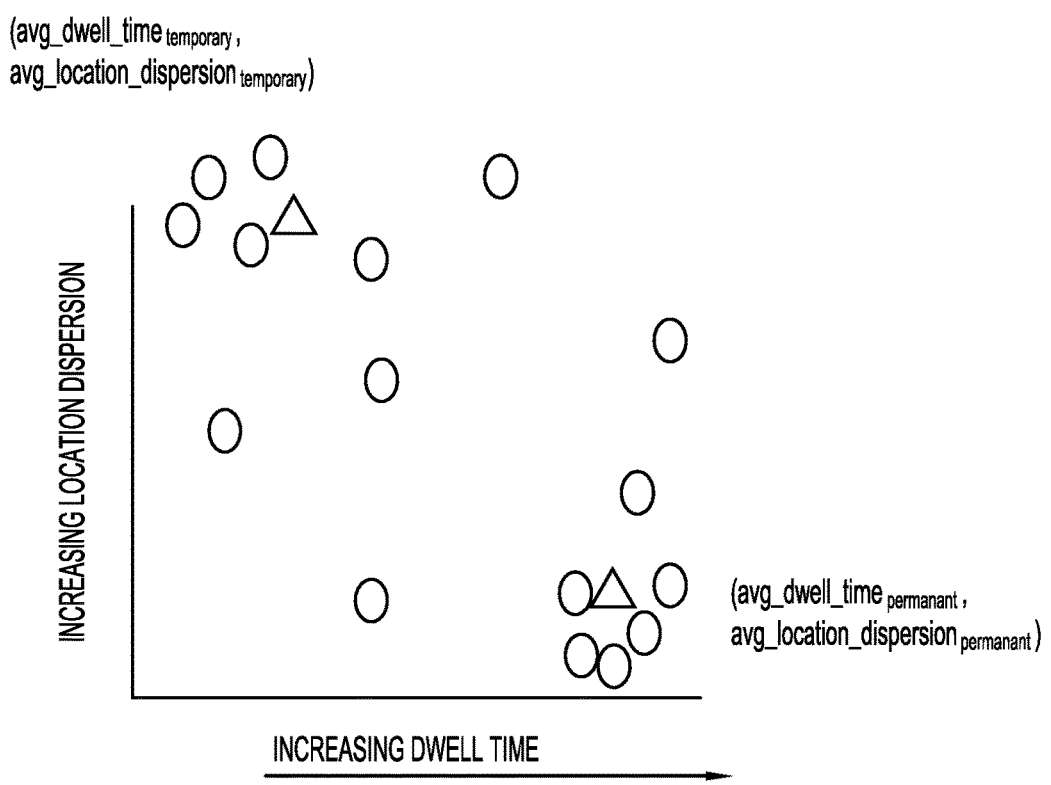
FIG. 7B is a graphical diagram illustrating an example of clustering location data based on spatial-temporal characteristics, according to an example embodiment.

An example is provided with respect to FIG. 7B. The average value of features, e.g., an average dwell time and average location dispersion, may be determined for permanent and temporary categories. A Euclidian distance may be determined between an individual unlabeled data point (with each data point corresponding to a set of aggregated location data from a mobile device user, represented by a dwell time and a location dispersion), and the unlabeled data point may assigned to the cluster to which it is closest. In some aspects, the cluster mean for a category is recalculated upon addition of a new data point to that category. Once all data points have been assigned to a respective cluster, the assignment to a particular cluster may be verified (as averages may change during the clustering process) by confirming that each data point has been assigned to the cluster to which it is closest (closest to the average value). FIG. 7B shows an example of data points, with each data point corresponding to a set of aggregated location data, being clustered based on feature values. Feature averages are represented by a triangle.

Referring back to FIG. 7A, at operation 570, based upon the results of the clustering process at operation 560, criteria used to classify aggregated location data may be updated. For example, if the average value for a dwell time corresponding to a mobile device user with a permanent status has changed, this value may be updated for future analysis.

In some aspects, operations 550-570 may occur on a daily basis. For example, as new aggregated data is received, clustering may be performed and corresponding feature statistics may be determined, characterizing spatial and temporal aspects of the aggregated data. In other embodiments, additional basic features may be considered with respect to time and space, including time of day (e.g., one or more hours of the day, a day of the week, etc.) and for space (e.g., a building, a floor, a zone, etc.)

Figure 8:
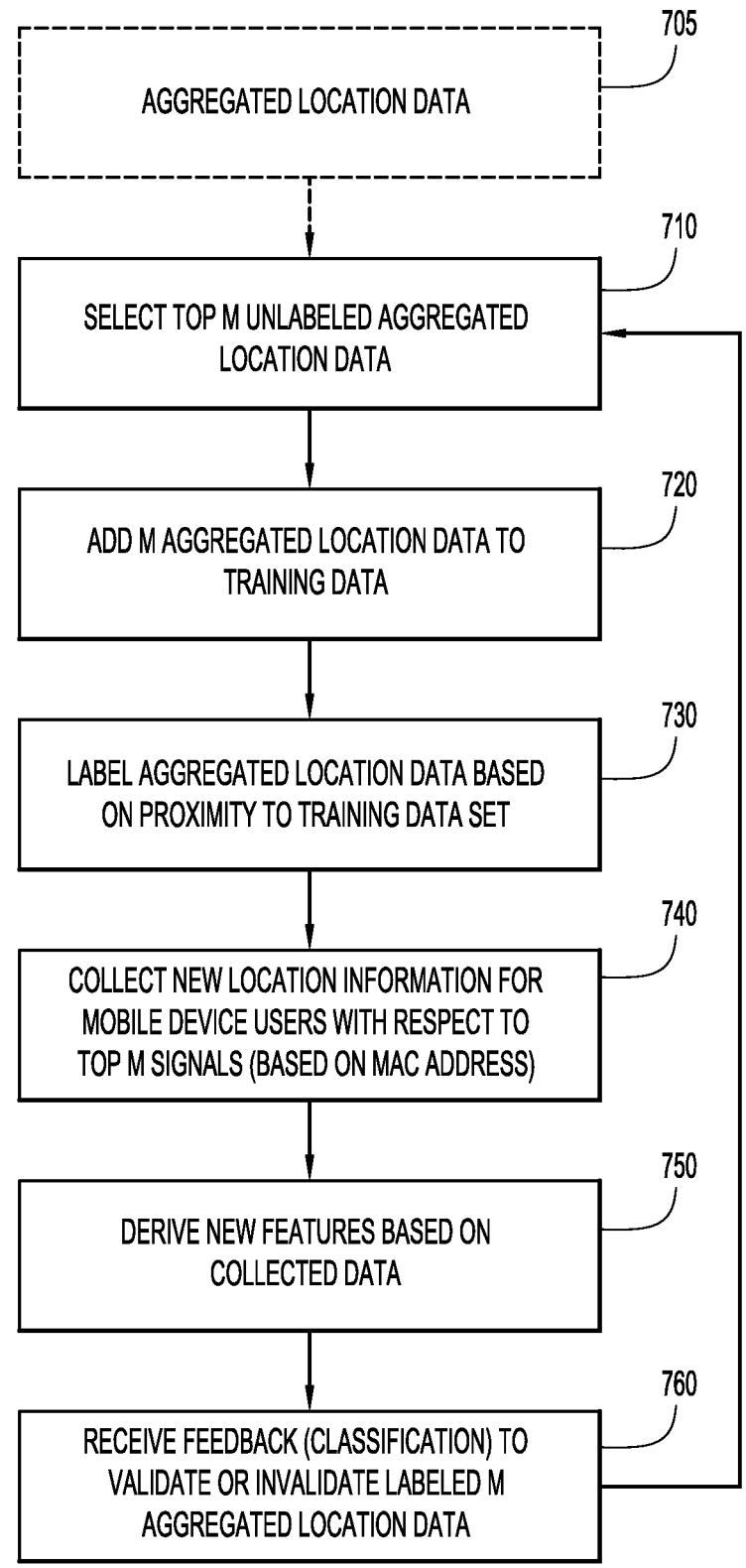
FIG. 8 is a flow chart generally depicting the operations of optimizing classification techniques, according to an example embodiment.

Referring to FIG. 8, a flow chart is shown for semi-supervised learning and model optimization to maintain precision/accuracy of the model for continuously increasing data sets. As aggregated location data increases (e.g., on a daily basis) at operation 705 and the sample size of the labeled mobile device users provided as part of the training data remains the same (which is quite small compared to a growing data set, a semi-supervised learning and optimization process may be performed to maintain the accuracy and precision of the classifier).

At operation 710, the top m unlabeled sets of aggregated location data, closest from a Euclidian distance perspective, to data points representing features of the training data are selected. In some aspects, sets of unlabeled aggregated location data may be obtained from the output of location data collection and aggregation logic 60, which collects new data on an ongoing basis. These m sets of aggregated location data are added to the training data at operation 720. The corresponding mobile device users of the newly added sets of aggregated location data are labeled based upon proximity to a category of the current training set (e.g., using basic features), at operation 730. In some aspects, operations 710-730 may be repeated on an ongoing basis.

As an example, the mobility patterns of employees are relatively stable compared with visitors, and therefore, simply choosing the m closest data points may lead to most or all of the m closest data points being assigned to the same category (e.g., permanent category), leading to an imbalance regarding the number of data points assigned to each category of the training data. In order to avoid this situation, for each category of mobile device user, the same number of closest new data points are selected for addition to the training data and are subsequently labeled based upon proximity to the corresponding category average.

Once the newly added sets of aggregated data are labeled, corresponding temporal and positional information may be continuously collected for the corresponding mobile device user, at operation 740, to derive new features based upon the temporal and spatial behavior of the labeled user. For example, features specific to employees working during certain times of day (e.g., features specific to the night shift), as shown at operation 750, may be identified.

At operation 760, continuous model optimization based on user feedback is optionally performed. A classifier may submit feedback to the system to provide feedback into the model, e.g., regarding whether the mobile device user has been correctly classified. If a classifier indicates that a mobile device user has not been correctly labeled, the weighting of this data point may be increased, e.g., with respect to the operations shown in FIG. 7A.

Figure 9:
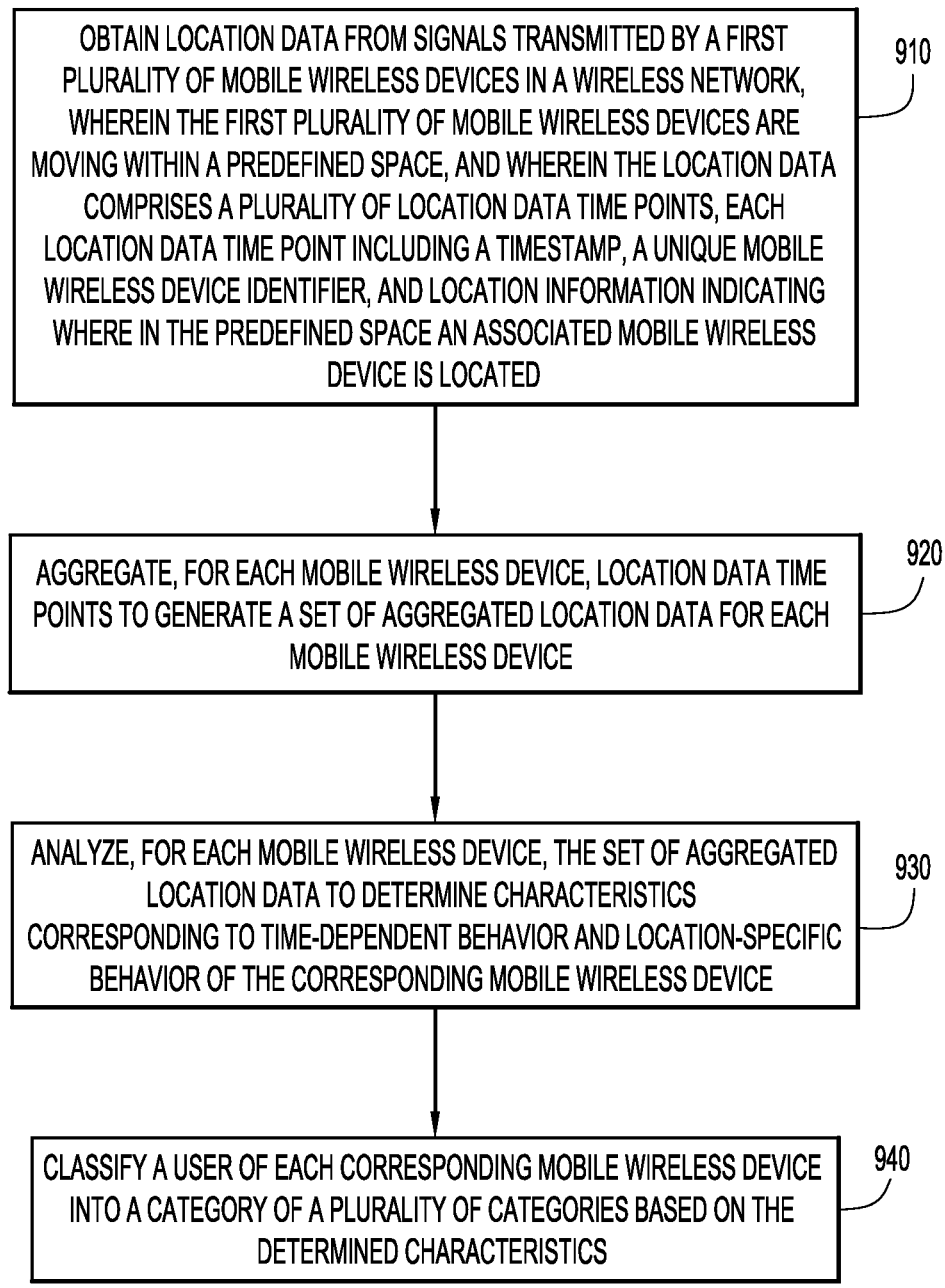
FIG. 9 is a flow chart generally depicting the operations of obtaining and analyzing location data to classify a mobile device user, according to an example embodiment.

FIG. 9 is a flow chart generally depicting the operations of obtaining and analyzing location data to classify a mobile device user according to an example embodiment. At operation 910, location data is obtained from signals transmitted by a first plurality of mobile wireless devices in a wireless network, wherein the first plurality of mobile wireless devices are moving within a predefined space, and wherein the location data comprises a plurality of location data time points, each location data time point including a timestamp, a unique mobile wireless device identifier, and location information indicating where in the predefined space an associated mobile wireless device is located. At operation 920, for each mobile wireless device, location data time points are aggregated to generate a set of aggregated location data for each mobile wireless device. At operation 930, for each mobile wireless device, the set of aggregated location data is analyzed to determine characteristics corresponding to time-dependent behavior and location-specific behavior of the corresponding mobile wireless device. At operation 940, a user of each corresponding mobile wireless device is classified into a category of a plurality of categories based on the determined characteristics.

The techniques presented herein provide a manner to classify, in an automatic or semi-automatic way, location data from mobile devices based on spatial-temporal characteristics of the location data. Compared to existing techniques, the techniques presented herein are cost-efficient, as manual collection of data is not needed for this approach. Additionally, the techniques presented herein may be applied to any similar scenario wherein location data of mobile devices users may be collected.

As the presented techniques provide for integrating new data in an automated manner, an up-to-date system may be maintained. Further, these techniques provide for performing basic feature learning based on spatial-temporal characteristics of the aggregated location data, and a continuous semi-supervised learning method is employed to leverage a small size of labeled samples (training data) and optimize the classification model based on user feedback.

In summary, in one form, a method is provided comprising: generating location data from signals transmitted by a first plurality of mobile wireless devices in a wireless network, wherein the first plurality of mobile wireless devices are moving within a predefined space, and wherein the location data comprises a plurality of location data time points, each location data time point including a timestamp, a unique mobile wireless device identifier, and location information indicating where in the predefined space an associated mobile wireless device is located; aggregating, for each mobile wireless device, location data time points to generate a set of aggregated location data for each mobile wireless device; analyzing, for each mobile wireless device, the set of aggregated location data to determine characteristics corresponding to time-dependent behavior and location-specific behavior of the corresponding mobile wireless device; and classifying a user of each corresponding mobile wireless device into a category of a plurality of categories based on the determined characteristics.

In another form, an apparatus is provided comprising: a network interface unit configured to enable network communications, a memory, and a processor configured to: generate location data from signals transmitted by a first plurality of mobile wireless devices in a wireless network, wherein the first plurality of mobile wireless devices are moving within a predefined space, and wherein the location data comprises a plurality of location data time points, each location data time point including a timestamp, a unique mobile wireless device identifier, and location information indicating where in the predefined space an associated mobile wireless device is located; aggregate, for each mobile wireless device, location data time points to generate a set of aggregated location data for each mobile wireless device; analyze, for each mobile wireless device, the set of aggregated location data to determine characteristics corresponding to time-dependent behavior and location-specific behavior of the corresponding mobile wireless device; and classify a user of each corresponding mobile wireless device into a category of a plurality of categories based on the determined characteristics.

In yet another form, a non-transitory computer readable storage media is provided that stores instructions that, when executed by a processor of a network or computing device, cause the processor to generate location data from signals transmitted by a first plurality of mobile wireless devices in a wireless network, wherein the first plurality of mobile wireless devices are moving within a predefined space, and wherein the location data comprises a plurality of location data time points, each location data time point including a timestamp, a unique mobile wireless device identifier, and location information indicating where in the predefined space an associated mobile wireless device is located; aggregate, for each mobile wireless device, location data time points to generate a set of aggregated location data for each mobile wireless device; analyze, for each mobile wireless device, the set of aggregated location data to determine characteristics corresponding to time-dependent behavior and location-specific behavior of the corresponding mobile wireless device; and classify a user of each corresponding mobile wireless device into a category of a plurality of categories based on the determined characteristics.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A computer-implemented method comprising:
   obtaining location data from signals transmitted by a first plurality of mobile wireless devices in a wireless network provided in a predefined physical space, wherein the first plurality of mobile wireless devices are moving within the predefined physical space, and wherein the location data comprises a plurality of location data time points, each location data time point including a timestamp, a unique mobile wireless device identifier, and location information indicating where within the predefined physical space an associated mobile wireless device is located;
aggregating, for each mobile wireless device, location data time points to generate a set of aggregated location data for each mobile wireless device;
analyzing, for each mobile wireless device, the set of aggregated location data to determine characteristics corresponding to time-dependent behavior and location-specific behavior of the corresponding mobile wireless device, including:
 a dwell time indicating how long the corresponding mobile wireless device has resided at a particular location inside the predefined physical space;
 a measure of floor dispersion indicating a first spatial distribution of the corresponding mobile wireless device within the predefined physical space; and
 a measure of location dispersion indicating a second spatial distribution, different from the first spatial distribution, of the corresponding mobile wireless device within the predefined physical space; and
classifying a user of each corresponding mobile wireless device into a category of a plurality of categories based on the determined characteristics.

2. The method of claim 1, further comprising:
performing classification of select sets of aggregated location data to classify the user of each corresponding mobile wireless device into one of a plurality of categories, wherein each set of aggregated location data is classified by a plurality of distinct classifiers;
generating a training data set based on the classified select sets of aggregated location data; and
wherein the classifying further comprises classifying the user of each corresponding mobile wireless device based on the determined characteristics and the training data set.

3. The method of claim 2, comprising:
selecting a subset of unlabeled aggregated data for new mobile wireless device users, and adding the selected subset to the training data set;
labeling each set of aggregated data based on proximity to a nearest classified mobile wireless device user;
generating continuously new aggregated location data pertaining to movement of each new mobile wireless device user; and
determining features based on the continuously generated data.

4. The method of claim 1 further comprising:
obtaining location data from signals transmitted by a second plurality of mobile wireless devices in the wireless network;
aggregating, for each of the second plurality of mobile wireless devices, location data time points to generate a set of aggregated location data;
generating a vector having at least a spatial component and a temporal component for each of the first plurality of mobile wireless devices and the second plurality of mobile wireless devices; and
grouping similar vectors together to form a cluster, and assigning a same category label to vectors within the same cluster.

5. The method of claim 1, wherein classifying comprises:
classifying, for location data having a relatively longer dwell time and relatively smaller measures of floor dispersion and location dispersion, the user of the corresponding mobile wireless device as belonging to a permanent category; and
classifying, for location data having a relatively shorter dwell time and relatively larger measures of floor dispersion and location dispersion, the user of the corresponding mobile wireless device as belonging to a temporary category.

6. The method of claim 1, comprising:
receiving feedback from a classification procedure, the feedback indicating whether the classification of the user of the corresponding mobile wireless device based on the determined characteristics is consistent with a classification performed by the classification procedure; and
updating, when classification is not consistent, the determined characteristics based on the feedback.

7. The method of claim 1, wherein the measure of floor dispersion indicates an amount of time that the corresponding mobile wireless device remains on one floor of a plurality of floors in the predefined physical space and the measure of location dispersion indicates how the corresponding mobile wireless is moving across any of the plurality of floors.

8. An apparatus comprising:
a network interface unit configured enable network communications;
a memory; and
a processor coupled to the network interface unit and configured to:
 obtain location data from signals transmitted by a first plurality of mobile wireless devices in a wireless network provided in a predefined physical space, wherein the first plurality of mobile wireless devices are moving within the predefined physical space, and wherein the location data comprises a plurality of location data time points, each location data time point including a timestamp, a unique mobile wireless device identifier, and location information indicating where within the predefined physical space an associated mobile wireless device is located;
 aggregate, for each mobile wireless device, location data time points to generate a set of aggregated location data for each mobile wireless device, and store the set of aggregated location data in the memory;
 analyze, for each mobile wireless device, the set of aggregated location data to determine characteristics corresponding to time-dependent behavior and location-specific behavior of the corresponding mobile wireless device, including:
  a dwell time indicating how long the corresponding mobile wireless device has resided at a particular location inside the predefined physical space;
  a measure of floor dispersion indicating a first spatial distribution of the corresponding mobile wireless device within the predefined physical space; and
  a measure of location dispersion indicating a second spatial distribution, different from the first spatial distribution, of the corresponding mobile wireless device within the predefined physical space; and
 classify a user of each corresponding mobile wireless device into a category of a plurality of categories based on the determined characteristics.

9. The apparatus of claim 8, wherein the processor is further configured to:

perform classification of select sets of aggregated location data to classify the user of each corresponding mobile wireless device into one of a plurality of categories, wherein each set of aggregated location data is classified by a plurality of distinct classifiers;

generate a training data set based on the classified select sets of aggregated location data, and store the training data in memory; and classify the user of each corresponding mobile wireless device based on the determined characteristics and the training data set.

10. The apparatus of claim 9, wherein the processor is further configured to:

select a subset of unlabeled aggregated data for new mobile wireless device users, and adding the selected subset to the training data set;

label each set of aggregated data based on proximity to a nearest classified mobile wireless device user;

generate continuously new aggregated location data pertaining to movement of each new mobile wireless device user; and determine features based on the continuously generated data.

11. The apparatus of claim 8, wherein the processor is further configured to:

obtain location data from signals transmitted by a second plurality of mobile wireless devices in the wireless network;

aggregate, for each of the second plurality of mobile wireless devices, location data time points to generate a set of aggregated location data, and store the aggregated location data in memory;

generate a vector having at least a spatial component and a temporal component for each of the first plurality of mobile wireless devices and the second plurality of mobile wireless devices; and group similar vectors together to form a cluster, and assigning a same category label to vectors within the same cluster.

12. The apparatus of claim 8, wherein the processor is further configured to:

classify, for location data having a relatively longer dwell time and relatively smaller measures of floor dispersion and location dispersion, the user of the corresponding mobile wireless device as belonging to a permanent category; and classify, for location data having a relatively shorter dwell time and relatively larger measures of floor dispersion and location dispersion, the user of the corresponding mobile wireless device as belonging to a temporary category.

13. The apparatus of claim 8, wherein the processor is further configured to:

receive feedback from a classification procedure, the feedback indicating whether the classification of the user of the corresponding mobile device based on the determined characteristics is consistent with a classification performed by the classification procedure; and update, when classification is not consistent, the determined characteristics based on the feedback.

14. The apparatus of claim 8, wherein the measure of floor dispersion indicates an amount of time that the corresponding mobile wireless device remains on one floor of a plurality of floors in the predefined physical space and the measure of location dispersion indicates how the corresponding mobile wireless is moving across any of the plurality of floors.

15. A non-transitory computer readable storage media encoded with instructions that, when executed by a processor of a computing device, cause the processor to:

obtain location data from signals transmitted by a first plurality of mobile wireless devices in a wireless network provided in a predefined physical space, wherein the first plurality of mobile wireless devices are moving within the predefined physical space, and wherein the location data comprises a plurality of location data time points, each location data time point including a timestamp, a unique mobile wireless device identifier, and location information indicating where within the predefined physical space an associated mobile wireless device is located;

aggregate, for each mobile wireless device, location data time points to generate a set of aggregated location data for each mobile wireless device, and store the set of aggregated location data in memory;

analyze, for each mobile wireless device, the set of aggregated location data to determine characteristics corresponding to time-dependent behavior and location-specific behavior of the corresponding mobile wireless device, including:

a dwell time indicating how long the corresponding mobile wireless device has resided at a particular location inside the predefined physical space;

a measure of floor dispersion indicating a first spatial distribution of the corresponding mobile wireless device within the predefined physical space; and a measure of location dispersion indicating a second spatial distribution, different from the first spatial distribution, of the corresponding mobile wireless device within the predefined physical space; and classify a user of each corresponding mobile wireless device into a category of a plurality of categories based on the determined characteristics.

16. The non-transitory computer readable storage media of claim 15, wherein the processor is configured to:

perform classification of select sets of aggregated location data to classify the user of each corresponding mobile wireless device into one of a plurality of categories, wherein each set of aggregated location data is classified by a plurality of distinct classifiers;

generate a training data set based on the classified select sets of aggregated location data; and classify the user of each corresponding mobile wireless device based on the determined characteristics and the training data set.

17. The non-transitory computer readable storage media of claim 15, wherein the processor is configured to:

obtain location data from signals transmitted by a second plurality of mobile wireless devices in the wireless network;

aggregate, for each of the second plurality of mobile wireless devices, location data time points to generate a set of aggregated location data, and store the aggregated data in memory;

generate a vector having at least a spatial component and a temporal component for each of the first plurality of mobile wireless devices and the second plurality of mobile wireless devices; and group similar vectors together to form a cluster, and assigning a same category label to vectors within the same cluster.

18. The non-transitory computer readable storage media of claim 15, wherein the processor is configured to:

classify, for location data having a relatively longer dwell time and relatively smaller measures of floor dispersion and location dispersion, the user of the corresponding mobile wireless device as belonging to a permanent category; and classify, for location data having a relatively shorter dwell time and relatively larger measures of floor dispersion and location dispersion, the user of the corresponding mobile wireless device as belonging to a temporary category.

19. The non-transitory computer readable storage media of claim 15, wherein the processor is configured to:

receive feedback from a classification procedure, the feedback indicating whether the classification of the user of the corresponding mobile wireless device based on the determined characteristics is consistent with a classification performed by the classification procedure; and update, when classification is not consistent, the determined characteristics based on the feedback.

20. The non-transitory computer readable storage media of claim 15, wherein the measure of floor dispersion indicates an amount of time that the corresponding mobile wireless device remains on one floor of a plurality of floors in the predefined physical space and the measure of location dispersion indicates how the corresponding mobile wireless is moving across any of the plurality of floors.

\* \* \* \* \*